Oct. 12, 1926.
R. KROEDEL
1,602,582
FOLDING CAMERA
Filed Dec. 29, 1924     2 Sheets-Sheet 1
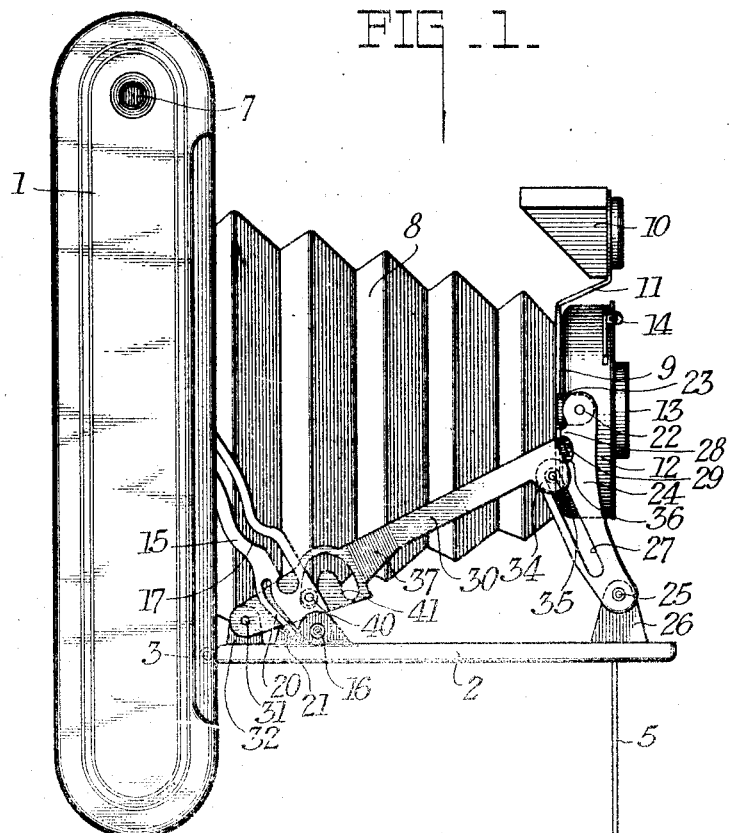
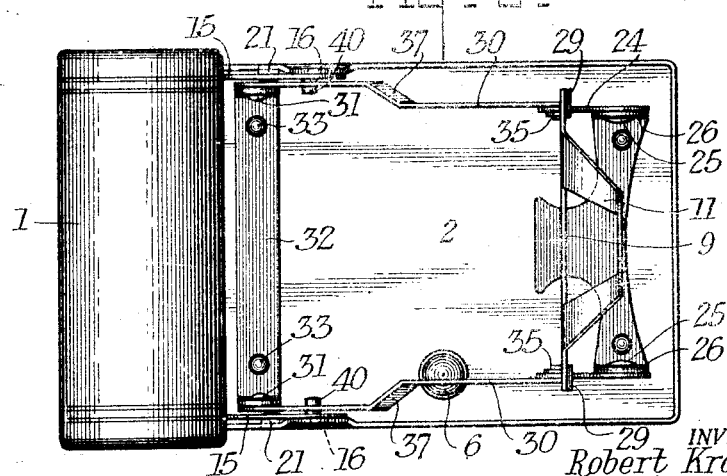
INVENTOR.
Robert Kroedel,
BY P. L. Stinchfield,
ATTORNEYS.

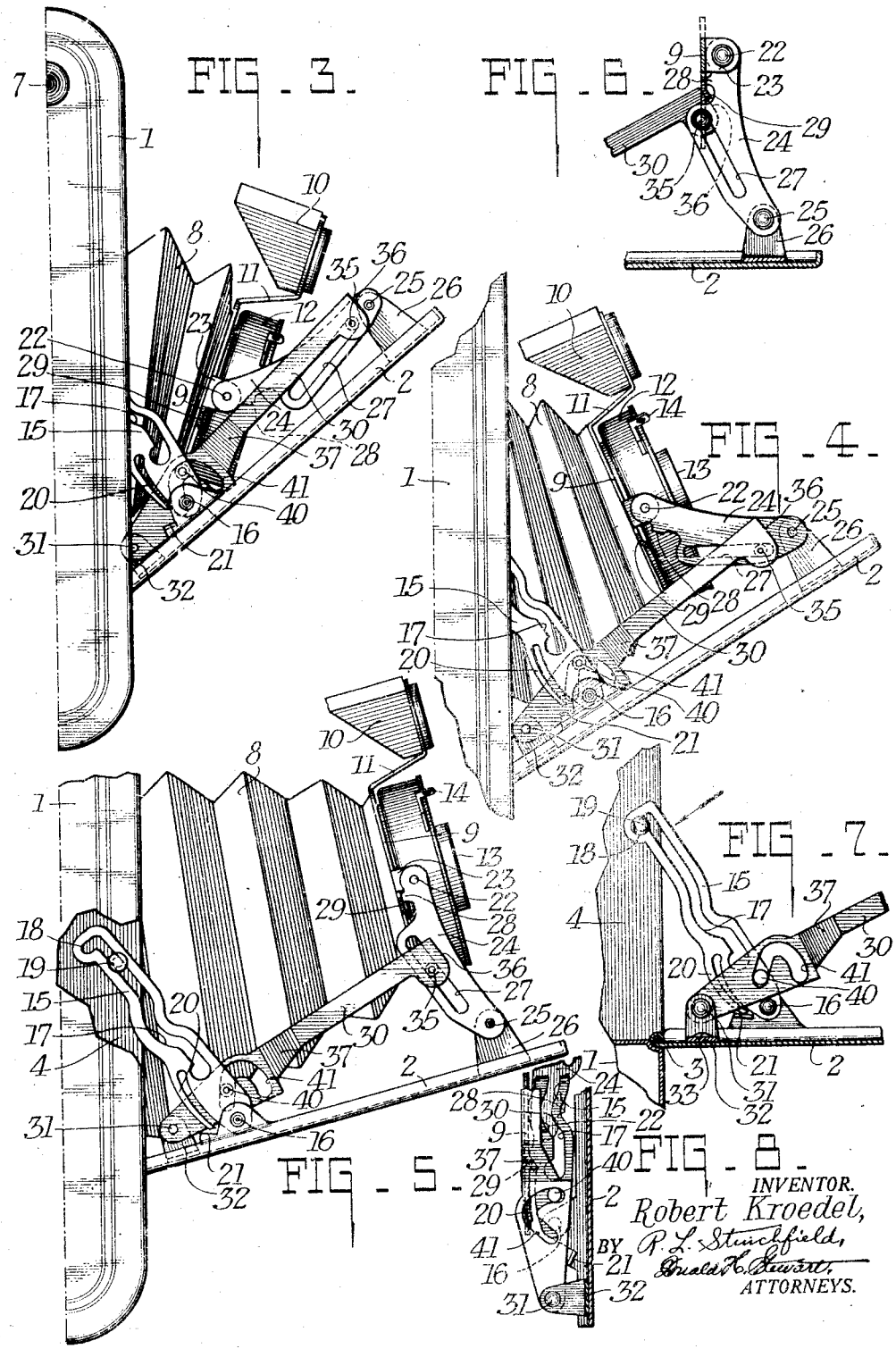

Patented Oct. 12, 1926.

1,602,582

UNITED STATES PATENT OFFICE.

ROBERT KROEDEL, OF ROCHESTER, NEW YORK, ASSIGNOR TO EASTMAN KODAK COMPANY, OF ROCHESTER, NEW YORK, A CORPORATION OF NEW YORK.

FOLDING CAMERA.

Application filed December 29, 1924. Serial No. 758,729.

This invention relates to photography and more particularly to folding cameras of the type in which the camera front carrying the shutter and lens is automatically projected into picture taking position by lowering the camera bed. One object of my invention is to provide such a camera in which the usual bed braces may be actuated to permit the camera and the front erecting mechanism to be closed. Another object of my invention is to provide a camera of the type described in which the folding brace may be moved through a definite path as the camera is opened and closed. Another object is to provide a camera of the class described which is simple in construction and relatively easy to assemble. Another object is to provide such a camera with suitably positioned parts for operating the mechanism through the bed braces, and other objects will appear hereinafter from the following specification, the novel features being pointed out in the claims at the end thereof.

This camera is an improvement over my two earlier Patents, Nos. 1,380,810, granted June 7, 1921, and 1,435,646, granted November 14, 1922, both for folding cameras.

Coming now to the drawings wherein like reference characters denote like parts throughout:

Fig. 1 is a side elevation of a camera constructed in accordance with and embodying one form of my invention;

Fig. 2 is a plan view of the same camera but with certain parts removed;

Figs. 3, 4 and 5 are fragmentary side elevations showing certain parts in their relative positions in successive steps of opening the camera, and Figs. 6, 7 and 8 are all fragmentary sectional details showing certain operating parts.

In the present embodiment there is a camera body 1 having the usual bed 2 hinged at 3 to the camera body, so that the bed may fold to cover the central opening 4 into which the parts carried by the bed fold when the camera is closed. The bed may be provided with a leg 5, and a tripod socket for vertical pictures 6. A tripod socket for horizontal pictures, 7, may be carried by the body 1.

The collapsible part of the camera consists of a bellows 8, attached to the camera body at one end, and to a lens board 9 at the other end. Lens board 9 supports a finder 10 upon bracket 11, and the camera shutter 12 and objective mount 13 centrally of the board. There is an exposure lever 14 on the shutter. So far the parts may all be of any well known construction.

The camera bed 2 is controlled in its swing about the hinge 3 by braces 15 pivoted at 16 to the bed and having slots 17 terminating in hooks 18 slidable upon studs 19 carried on the inner side walls of the camera body 1. Springs 20, by lying against lugs 21 may tend to hold the slidable end of the brace forwardly (i. e. toward the objective) and thus hold the hooks 18 against the studs 19. In this position the bed is latched open. To close the camera, the braces are pressed inwardly, see the arrows in Fig. 7, releasing the hooks 18 from the studs 19 and permitting the bed to fold.

The lens board 9 is swingingly carried upon pins 22 passing through lugs 23 and links 24, the lower ends of the links being pivoted at 25 to ears 26 attached to the bed. Links 24 are slotted at 27, and have lugs 28 adapted to engage one side of the extensions 29 of the lens board.

The lens board is held erect by braces 30 pivoted at 31 to a yoke 32 attached to the bed at 33. The ends 34 of the braces carry studs 35 passing through slots 27 of links 24, and they are provided with cam faces 36 of which engage the lens board extensions 29. When the parts are in the position shown in Fig. 1 the lens board is firmly held in an erect position. Braces 30 are provided with offsets 37 inside of which the lugs 29 of the lens board may lie when in a folded or closed position.

In order to move the braces 30 to cause the camera front to be erected and to be folded in the proper timed relation, these members 30 have a slidable connection with the bed braces 15. This connection is preferably a pin and slot connection. Pins 40 carried by braces 15 extend through the cam slots 41 in the lens board supporting braces 30.

Fig. 8 shows the relation of the parts just described in a closed or folded position. By swinging the bed 2 about the hinge 3, pin 40 slides idly in slot 41 as the brace 15 swings about its pivot, as for a portion of this movement the slot 41 is concentric with the path of the pin. Fig. 3 shows the pin at the end of the concentric portion of the slot, and as the bed is moved beyond this point the pin strikes the cam edges of slot 41 and starts to raise braces 30. Pins 40 approach pintles 31 as the bed is moved further, Fig. 5 and the braces 30 are raised more and more, this movement swinging the lens board 9 upon links 24 through slots 27 and studs 35 until finally extensions 29 of the lens board are engaged front and back by cam faces 36 and lugs 28, thus securing the lens in an erect position. Just as this position is reached springs 20 cause the hooks 18 to snap into the position shown in Fig. 7 upon the studs 19, in which position the bed 2 can not be either raised or lowered without being first released.

To close or collapse the camera the bed braces 15 are pushed against the springs 20 in direction of arrow, Fig. 7, releasing hooks 18 so that the studs 19 are released and may then slide through the slots 17 as the bed is swung upon its hinge 3. The first part of the closing movement causes the pin and slot 40, 41 to quickly fold the parts to the position as in Fig. 3, after which further movement closes the bed against the camera body with the shutter objective mount and finder lying against the bed.

From Fig. 8 it can be readily seen that the offsets 37 in braces 30 permit the lugs 29 extending to the sides of lens board 9 to fold toward the bed. If the braces were not so offset these lugs would lie on top of the braces.

Having thus described my invention what I claim is new and desire to secure by Letters Patent is:

1. In a folding camera the combination with a camera body and a bed hinged thereto, of a brace for supporting the bed, a foldable lens carriage swingly supported by the bed, a hinged brace for holding the foldable carriage erect, and a connection between said hinged brace and the bed braces for releasing the holding means, whereby the lens carriage may fold.

2. In a folding camera, the combination with a camera body and a bed hinged thereto, of a brace for supporting the bed, a foldable lens carriage swingingly supported by the bed, a hinged brace supported by the bed for holding the foldable carriage erect, and connections between the two braces, whereby the lens carriage supporting brace may be moved from its erect position by means of the bed brace.

3. In a folding camera, the combination with a camera body, and a bed hinged thereto, of a brace for supporting the bed, a foldable lens carriage swingingly supported by the bed, a hinged brace supported by the bed and movable in two directions for supporting or releasing the folding lens carriage and connections between the two braces for moving the lens carriage brace in either of its two directions through the bed brace.

4. In a folding camera, the combination with a camera body, and a bed hinged thereto, of a brace for supporting the bed, a foldable lens carriage swingingly supported by the bed, a hinged brace pivotally supported to swing to and from a position in which it may hold the lens carriage erect, and connections between the bed and lens carriage braces whereby the latter may be moved differentially with respect to and by the bed brace.

5. In a folding camera, the combination with a camera body and a bed hinged thereto, of a brace for supporting the bed, a foldable lens carriage swingingly supported by the bed, a hinged brace pivotally supported to swing to and from a position in which it may hold the lens carriage erect, and connections between the bed and lens braces including a pin on one member engaging a cam on the other member whereby the movement of one member is controlled by movement of the other member.

6. In a folding camera, the combination with a camera body and a bed hinged thereto, of a brace for supporting the bed, a foldable lens carriage swingingly supported by the bed, a hinged brace pivotally supported to swing to and from a position in which it may hold the lens carriage erect, and connections between the bed and lens braces including a pin on one member engaging a cam on the other member, the shape of the cam being such that the lens carriage brace will be moved to a less extent than the bed brace.

7. In a folding camera, the combination with a body, a bed hinged thereto, a folding lens board and a folding means on the bed swingingly supporting the lens board and provided with guides, of folding arms for the lens board pivoted to the bed and slidably cooperating with the guides, braces for supporting the bed, and operable connections between the bed braces and the arms whereby the latter members will be moved through a definite path by the former.

8. In a folding camera, the combination with a body, a bed hinged thereto and a folding brace connecting the bed and body and having a locked position where the camera is extended, a folding lens board and a brace connected to the bed for holding the lens board in an operative position, and connections between the bed brace and the lens board brace for releasing the latter from its operative position by moving the bed brace from its locked position.

9. In a folding camera the combination with a body, a bed hinged thereto and a folding brace connecting the hinged bed and body being adapted to swing through an angle of more than 90° between an open and a closed position, of a folding lens board and a brace for holding the lens board in an operative position, said lens board being adapted to swing through an angle of less than 90°, and a pin and slot connection between the bed brace and the lens board brace whereby they will be actuated together in time relation.

10. In a folding camera the combination with a body, a bed hinged thereto, of a folding lens carried having lugs extending therefrom swingingly mounted on the bed, braces adapted to hold the lens carriage erect, said braces having portions adapted to contact with the lugs when holding the carriage erect, a portion of the braces being spaced further from each other than the spacing of the lug's contacting portions whereby the lugs may pass between the braces, when the lens carriage is folded.

11. In a folding camera the combination with a body, a bed hinged thereto, of a folding lens carriage having a lug extending therefrom and swingingly mounted on the bed, a brace adapted to hold the lens carriage erect, an offset portion included in said brace, and a face carried by the brace and adapted to contact with the lug when the lens carriage is erect, said lug being adapted to lie behind the offset portion of the brace when the lens carriage is folded.

Signed at Rochester, New York, this 24th day of December, 1924.

ROBERT KROEDEL.